(12) United States Patent
Yin et al.

(10) Patent No.: US 7,379,051 B2
(45) Date of Patent: May 27, 2008

(54) FOLDABLE COMPUTER MOUSE

(75) Inventors: Chun-Hsiung Yin, Tainan (TW);
Hsun-Li Huang, Hsinchu (TW);
Chih-Wei Wu, Taipei (TW)

(73) Assignee: Qisda Corporation, Taoyuan (TW)

( * ) Notice: Subject to any disclaimer, the term of this patent is extended or adjusted under 35 U.S.C. 154(b) by 590 days.

(21) Appl. No.: 11/001,953

(22) Filed: Dec. 1, 2004

(65) Prior Publication Data
US 2005/0116934 A1 Jun. 2, 2005

(30) Foreign Application Priority Data
Dec. 2, 2003 (TW) .............................. 92133939 A

(51) Int. Cl.
*G06F 3/033* (2006.01)
(52) U.S. Cl. ...................... 345/163; 345/156; 361/681
(58) Field of Classification Search ........ 345/156–167; 361/683, 686, 681; 341/21–23
See application file for complete search history.

(56) References Cited
U.S. PATENT DOCUMENTS

| | | | |
|---|---|---|---|
| 6,304,249 B1 | 10/2001 | Derocher et al. ........... | 345/163 |
| 2003/0103040 A1* | 6/2003 | Koike et al. ................ | 345/163 |
| 2003/0184521 A1* | 10/2003 | Sugita ......................... | 345/163 |

FOREIGN PATENT DOCUMENTS

| | | | |
|---|---|---|---|
| CN | 2381076 | | 5/2000 |
| JP | 02000029625 A | * | 1/2000 |
| KR | 2001641010000 | | 2/2000 |
| TW | 347129 | | 12/1998 |

* cited by examiner

*Primary Examiner*—Richard Hjerpe
*Assistant Examiner*—Kimnhung Nguyen
(74) *Attorney, Agent, or Firm*—Thomas, Kayden, Horstemeyer & Risley

(57) ABSTRACT

A foldable computer mouse including a mouse body, a sensor and an extension part is disclosed. The bottom of the mouse body includes a receiving space and a contact surface, and the sensor is disposed on the contact surface of the bottom of the mouse body. The extension part is pivotally connected to one side of the mouse body and adjacent to the receiving space. When the extension part rotates outwards to a predetermined location, the contact surface between the foldable computer mouse and users is increased. Yet when the extension part rotates inwards to the inside of the receiving space, the size of the foldable computer mouse is reduced for easy storage. When the extension part rotates outwards to the predetermined location, users can operate the foldable computer mouse, and when the extension part rotates inside the receiving space, users can operate the foldable computer mouse as well.

18 Claims, 6 Drawing Sheets

FOLDABLE COMPUTER MOUSE

This application incorporates by reference Taiwan application Serial No. 92133939, filed Dec. 2, 2003, the subject matter of which is incorporated herein by reference.

BACKGROUND OF THE INVENTION

1. Field of the Invention

The invention relates to a foldable computer mouse, and particularly to a wireless and foldable optical mouse.

2. Description of the Related Art

The computer mouse is a kind of computer pointing device for controlling the movement of the cursor on the screen. To meet the demand of less in size, the spare space is usually reduced and by the conventional technology. A blemish in an otherwise perfect thing is that reducing the size of the mouse will also reduce the contact surface between the mouse and the user. Therefore, the reformed products are produced in order to avoid the above-mentioned disadvantages.

Referring to FIG. 1A, the three-dimensional view of the operational configuration of the conventional portable mouse is illustrated. The portable mouse 100 is a wired mouse including a cable 110, and each side of the housing 102 includes a track respectively. The cover 108 can fit the mouse body 102 with an aid of the track and slide along the track. The two buttons 104 comes into being one part of the mouse body 102. In the FIG. 1A, the cover 108 of the portable mouse 100 slides to the first location and the portable mouse 100 is presented in the operational configuration.

FIG. 1B is a state diagram illustrating the conventional portable mouse, which lies in between the operational configuration and compact form. The location of the cover 108 is between the operational configuration and the compact form. When the cover 108 slides towards the direction 112, the portable mouse 100 is in the operational configuration. On the other hand, when the cover 108 slides towards the direction 114, the top surface of the portable mouse 100 is covered by the cover 108 and the portable mouse 100 is in the compact form.

FIGS. 2A to FIG. 2C illustrate another conventional reducible mouse. FIG. 2A illustrates the three-dimensional view of the conventional foldable computer mouse. FIG. 2B illustrates the three-dimensional view of the compact form of the conventional foldable computer mouse. FIG. 2C illustrates the cross section view of the operational configuration of the conventional foldable computer mouse.

The foldable computer mouse includes the first housing 202 and the second housing 204. The first housing 202 is pivotally connected to the second housing 204 with an aid of hinge 206. A tracking system 212 is disposed on the bottom of the first housing 202. When the foldable computer mouse 200 is in the operational configuration, the tracking system 212 is exposed to the external environment as shown in FIG. 2C. At this time, users can operate the foldable computer mouse 200. On the contrary, when the foldable computer mouse 200 is in the compact form, the tracking system 212 is covered by the second housing 204, and therefore, users are unable to operate the foldable computer mouse 200.

Additionally, the top surface of the first housing 202 is the convex, and there is no any sensor disposed on the top surface of the first housing 202. Therefore, when the foldable computer mouse 200 is in the compact form, the convex disables the foldable computer mouse 200 from operating on a working surface.

The foregoing two modes of the mouse have the advantages of the reduced size and the portability, but when the portable mouse 100 is in compact form, it is obvious that two buttons are covered by the cover 108 and unable to be operated at the same time. Similarly, when the conventional foldable computer mouse 200 is in compact form, the tracking system 212 is covered by the second housing 204 and disables the foldable computer mouse 200 from detecting the location on the working surface. Therefore, users are unable to operate the foldable computer mouse 200. Users are unable to operate the mouse in the compact form no matter what mode is used.

SUMMARY OF THE INVENTION

Accordingly, the object of the present invention is to provide a foldable computer mouse for increasing the contact surface between the foldable computer mouse and the users. Therefore users can operate in the comfort of the extension part pivotally connected to the mouse body. Moreover, the foldable computer mouse can maintain the operational state in the compact form, and the object of being suitable for both of short and long operation is achieved.

It is an object of the present invention to provide a foldable computer mouse for allowing users to operate in the two different modes respectively. The foldable computer mouse includes a mouse body, a sensor and an extension part. The bottom of the mouse body includes a receiving space and a bottom contact surface. The sensor is disposed on the contact surface of the bottom of the mouse body. The extension part is pivotally connected to one side of the mouse body and adjacent to the receiving space. When the extension part rotates outwards to the predetermined location, the contact surface between the foldable computer mouse and the users is increased. While the extension part rotates inwards into the receiving space, the size of the foldable computer mouse is reduced. Therefore there is a benefit to the storage of the foldable computer mouse is caused. Furthermore, users can operate the foldable computer mouse no matter the extension part rotates outwards to the predetermined location or rotates inside into the receiving space.

It is another object of the present invention to provide a foldable computer mouse for controlling the movement of the cursor on the screen. The foldable computer mouse includes a mouse body, a hinge and an extension part. The bottom of the mouse body includes a receiving space and the hinge is located at one side of the receiving space. The sensor is disposed on the bottom of the mouse body other than the receiving space area. The extension part is pivotally connected to the body with the hinge, and the extension part can rotate opposite to the hinge for changing the form of the foldable computer mouse. When the extension part rotates to a predetermined location, the foldable computer mouse is in an extension form, and users can operate the foldable computer mouse. When the extension part is located inside the receiving space, the foldable computer mouse is in a compact form, and users can operate the foldable computer mouse as well.

It is another object of the present invention to provide a computer mouse, including a mouse body, a sensor, and an extension part. The bottom of the mouse body is provided with a receiving space and a bottom contact surface. The sensor disposed on the bottom contact surface can detect the motion of the mouse body relatively to the plane where the mouse body is placed. The extension part is pivotally connected to the mouse body. When the extension part rotates outwards outside the accepting space, the extension part and the mouse body together form a upper contact surface, and therefore the upper contact surface between the mouse and the users is increased. When the extension part rotates inwards into the receiving space, the sensor is still exposed outside the bottom of the mouse body. The sensor can still detect the relative motion on the plane.

DETAILED DESCRIPTION OF THE INVENTION

Figure 1B:
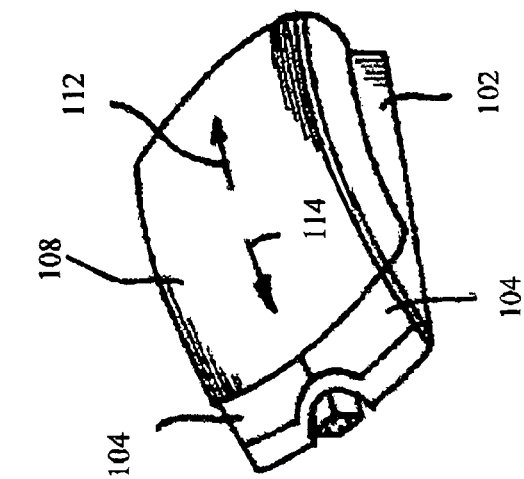
FIG. 1B (Prior Art) is a state diagram illustrating the conventional portable mouse, which lies in between the operational configuration and the compact form.
Figure 1A:
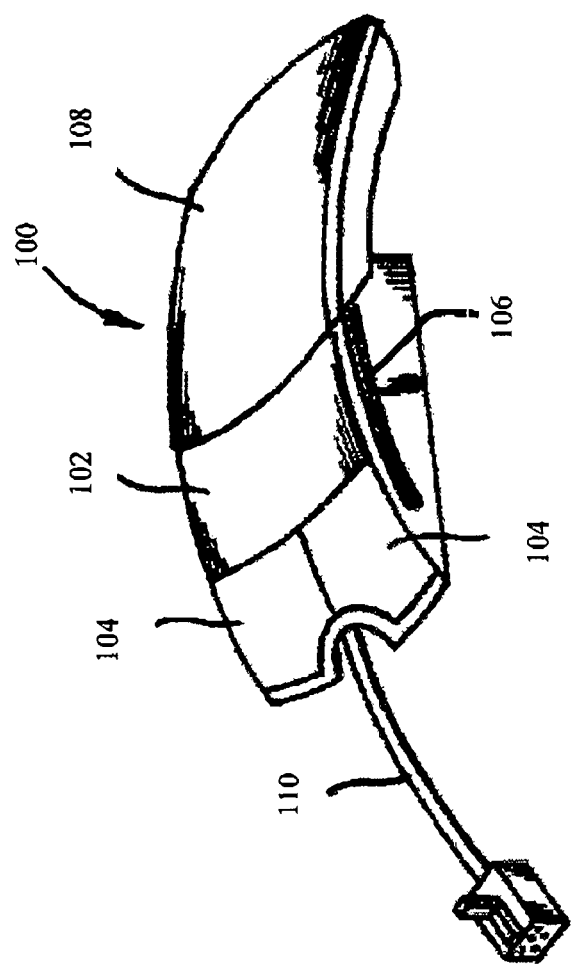
FIG. 1A (Prior Art) is a three-dimensional view illustrating the operational configuration of the portable mouse.
Figure 2A:
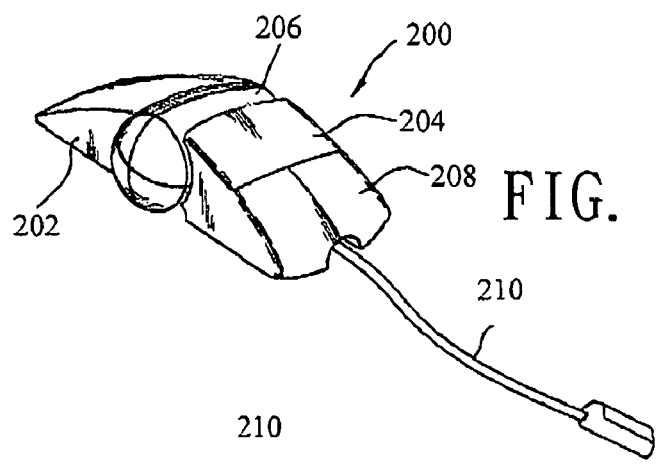
FIG. 2A (Prior Art) is a three-dimensional view illustrating the conventional foldable computer mouse.
Figure 2B:
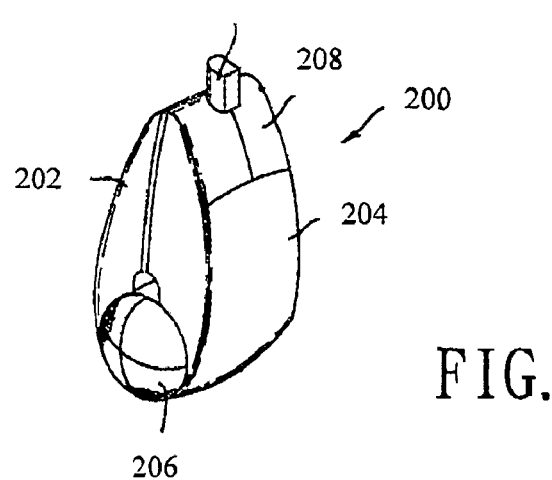
FIG. 2B (Prior Art) is a three-dimensional view illustrating the compact form of the foldable computer mouse.
Figure 2C:
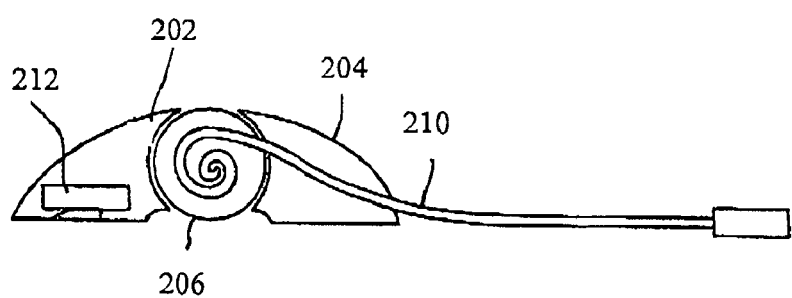
FIG. 2C (Prior Art) is a cross-section view depicting the operational configuration of the conventional foldable computer mouse.
Figure 3A:
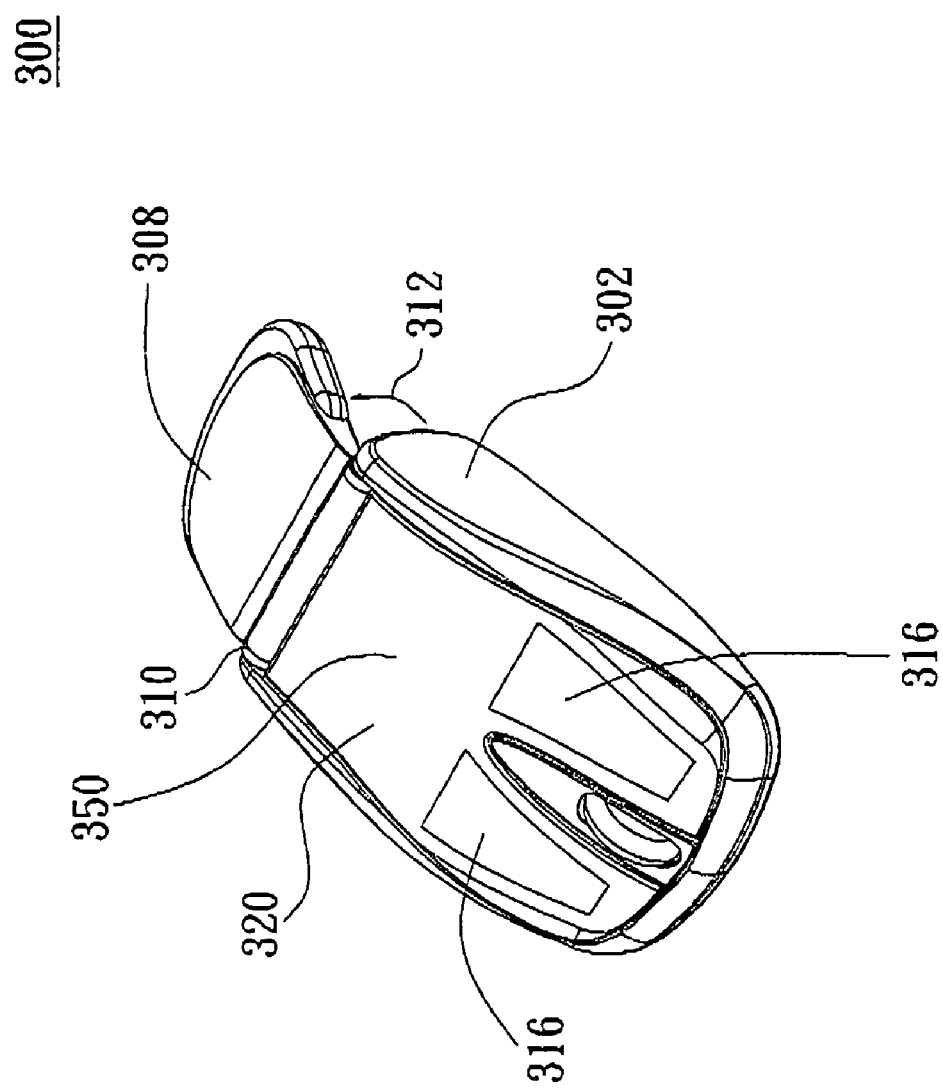
FIG. 3A is a three-dimensional view illustrating the extension form of the foldable computer mouse according to a preferred embodiment of the present invention.
Figure 3B:
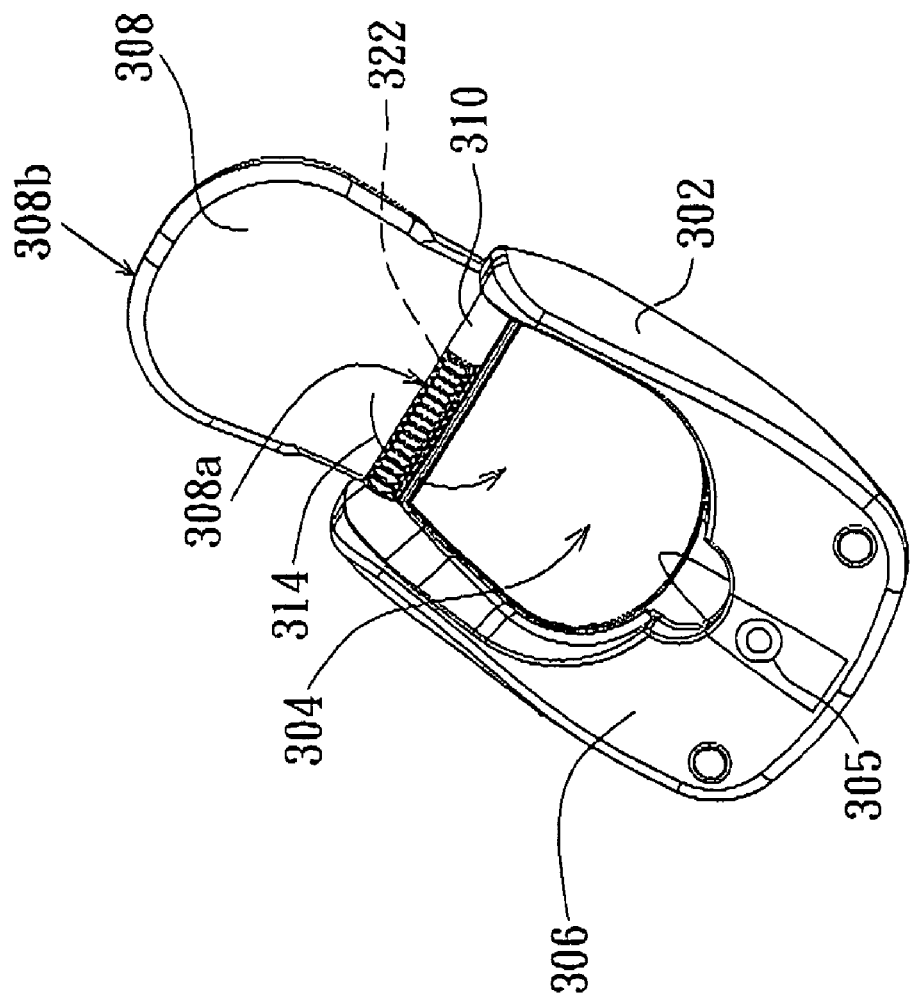
FIG. 3B is a three-dimensional view illustrating another side view of the foldable computer mouse depicted in FIG. 3A.

FIG. 3A is the three-dimensional view of the extension form of the foldable computer mouse according to the preferred embodiment of the present invention. FIG. 3B is a three-dimensional view illustrating another side view of the foldable computer mouse depicted in FIG. 3A. The foldable computer mouse includes the mouse body 302, the sensor 305 and the extension part 308. The bottom of the mouse body 302 includes a receiving space 304 acting as a receiving space to receive and embed the extension part and a bottom contact surface 306. The sensor 305 is disposed on the bottom contact surface 306 for detecting the motion of the mouse relative to the plane. Furthermore, a hinge 310 is disposed on one side of the mouse body 302 and adjacent to the receiving space 304. The mouse body 302 and the extension part 308 are pivotally connected together by the hinge 310. The location of hinge is preferably to be on the top of the side wall close to the user of the mouse body 302. The top surface 320 of the mouse body 302 is used to support the user's palm. At least one button 316 is exposed out of the top surface 320 for operating by users. When the extension part 308 rotates outwards to the predetermined location outside of the accepting space (as shown in 3A), the extension part 308 and the mouse body 302 together form a upper surface 350, and therefore the upper contact surface 350 between the mouse and the users is increased. In other words, the mouse body 302, the top surface 320 and the extension part 308 together can support the user's palm. Accordingly, the upper contact surface 350 between the foldable computer mouse 300 and the users is increased and users' comfort is enhanced.

On the other hand, when the extension part 308 rotates inwards along the direction 314 into the receiving space 304, the size of the foldable computer mouse is reduced for easy storage. At the same time, the sensor 305 is exposed out of the bottom contact surface 306 of the mouse body 302 so that the sensor 305 can continue detecting the motion of the mouse relative to the plane, such as the working surface 402. Therefore, no matter the extension part 308 rotates outwards to the predetermined location or rotates inside the receiving space 304, users can operate the foldable computer mouse 300. In other words, the body 302 and the extension part 308 can rotate relative to the hinge 310 for changing the operational form of the foldable computer mouse. When the extension part 308 rotates to the predetermined location (as shown in 3A), the foldable computer mouse 300 is in an extension form. When the extension part 308 is located inside the receiving space 304, the foldable computer mouse is in a compact form.

The capacity of the receiving space 304 is bigger than the volume of the extension part 308 so that the extension part 308 can be embedded inside the receiving space 304 completely. Therefore, when extension part 308 is located inside the receiving space 304, the foldable computer mouse is in a compact form, and users can still operate the foldable computer mouse 300 as usual. The bottom surface of the receiving space 304 of the foldable computer mouse 300 is a slope, that is to say, the depth of the receiving space 304 turns from deep to shallow. The receiving space 304 extends from the top of the side wall close to the user to the sensor 305. The hinge 310 is located in the deepest spot. The setup of the slope makes use of the spare space of the mouse body 302 efficiently.

Figure 4A:
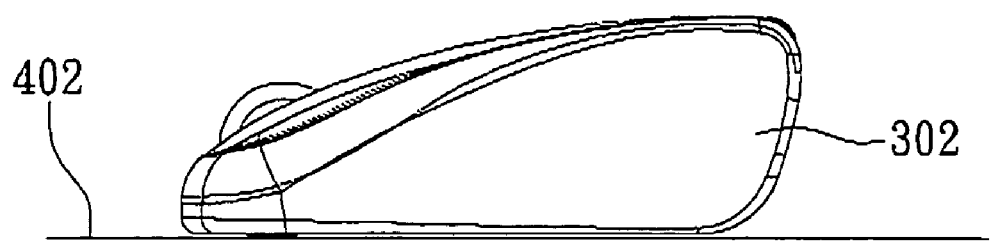
FIG. 4A is a lateral view illustrating the extension form of the foldable computer mouse according to the preferred embodiment of the present invention.
Figure 4B:
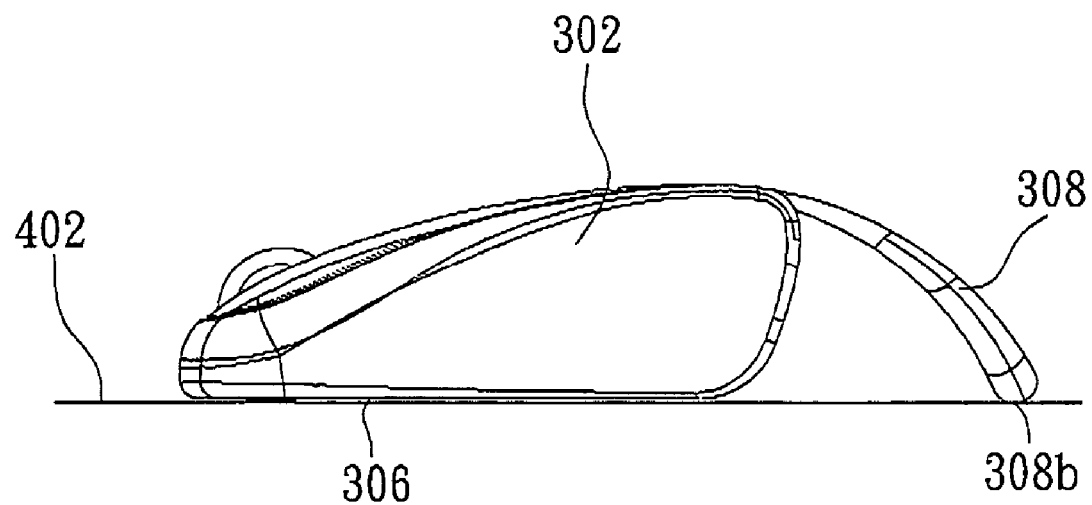
FIG. 4B is a lateral view illustrating the extension part of the foldable computer mouse is lifted depicted in FIG. 4A.

Referring to FIGS. 3B, 4A and 4B, FIG. 4A illustrates the lateral view of the extension form of the foldable computer mouse according to the preferred embodiment of the present invention. FIG. 4B illustrates the lateral view of the lifted extension part of the foldable computer mouse. The extension part 308 includes the first side 308a and a second side 308b. The first side 308a is pivotally connected to the mouse body 302 by the hinge 310. The second side 308b is opposite to the first side 308a. When the extension part 308 rotates outwards to the predetermined location, the second side 308b and the bottom contact surface of the mouse body 302 are located on the same plane, such as the working surface 402. In other words, the upper edge of the extension part 308 connects with the top of the side wall of the mouse body 302 close to the user, and the lower edge of the extension part 308 connects with the plane. Therefore, when users operate the foldable computer mouse 300 in the extension form, the pressure from the palm can be distributed to the bottom 306, hinge 310 and the second side 308b and stabilize the structure of the extension form. The computer mouse 300 further includes elastic elements disposed between the upper edge of the extension part 308 and the mouse body 302. The example of the elastic elements is the spring 322 disposed inside the hinge 310 for providing an elasticity which rotates the extension part 308 towards the receiving space 304.

Figure 5A:
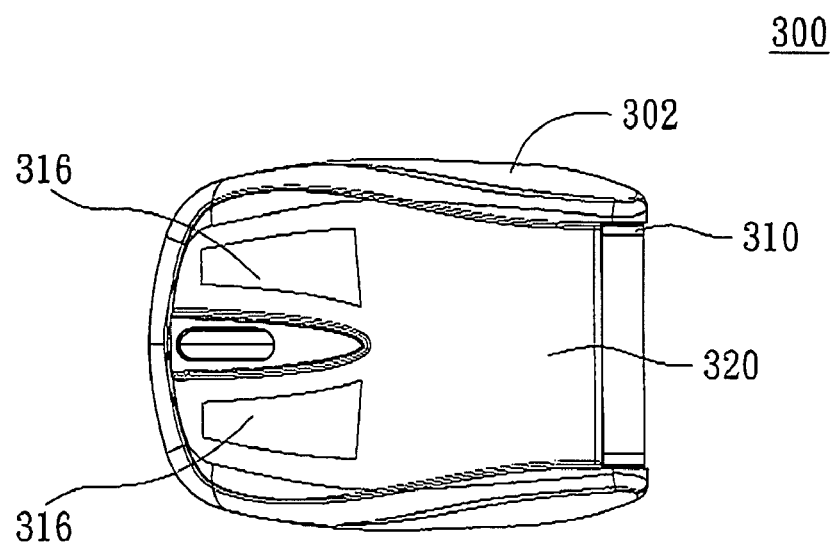
FIG. 5A is a top view illustrating the compact form of the foldable computer mouse according to the preferred embodiment of the present invention.
Figure 5B:
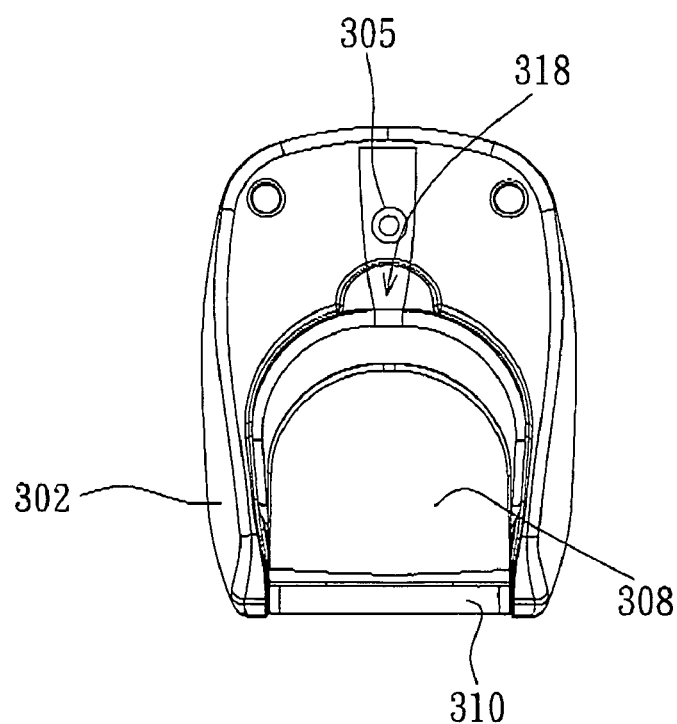
FIG. 5B is a bottom view of the foldable computer mouse depicted in FIG. 4A.

Referring to FIG. 5A, 5B, FIG. 5A illustrates the top view of the compact form of the foldable computer mouse according to the preferred embodiment of the present invention. FIG. 5B illustrates the bottom view of the foldable computer mouse depicted in the FIG. 4A. The extension part 308 of the preferred embodiment is an ergonomic plate. The surface of the ergonomic plate is curved to fit the radian of the palm. The configuration of the ergonomic plate and the shape of the receiving space 304 match substantially. For example, the bottom of the receiving space 304 includes a radian and the radian of the receiving space 304 matches the radian of the ergonomic plate substantially. Another example is the lower edge of the extension part is a pre-design curve, and the receiving space 304 includes the same shape of the pre-design curve substantially. In addition, the bottom of the mouse body 302 further includes an extension receiving space 318, which acts as finger insertion space allowing user's finger insertion to lift the extension part 308. The extension receiving space 318 and the receiving space receiving space 304 are communicated.

The design of the extension part 308 can not only resolve the conflict between the reduced size and the comfort, but also achieve two forms to meet the demands for both short and long operation.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A foldable computer mouse comprising:
   a mouse body having an upper surface and a bottom, the bottom having a receiving space and a contact surface;
   a sensor disposed on the contact surface; and
   an extension part pivotally connected to the mouse body, when the extension part rotating outwards to a predetermined position, the extension part extending the upper surface, and when the extension part rotating inwards into the receiving space, the upper surface being reduced,
   wherein the sensor being exposed on the contact surface when the extension part is either disposed at one of the predetermined location and the receiving space.

2. The foldable computer mouse as claimed in claim 1, wherein the mouse body further comprises a hinge adjacent to the receiving space, and the extension part is pivotally connected to the mouse body by the hinge.

3. The foldable computer mouse as claimed in claim 1, wherein the bottom of the receiving space is a slope.

4. The foldable computer mouse as claimed in claim 1, extension part further comprising a first side pivotally connected to the mouse body and a second side opposite to the first side, wherein when the extension part rotates outwards to the predetermined location, the second side and the bottom of the mouse body are at the same level.

5. The foldable computer mouse as claimed in claim 1, wherein the extension part is an ergonomic plate and the ergonomic plate is curved.

6. The foldable computer mouse as claimed in claim 5, wherein the bottom configuration of the receiving space substantially matches the shape of the ergonomic plate.

7. A foldable computer mouse for controlling the movement of the pointer comprising:
   a mouse body with a receiving space and a sensor, wherein the receiving space is located on a bottom of the mouse body and the sensor is disposed on the bottom other than the receiving space;
   a hinge located at one side of the mouse body; and
   an extension part pivotally connected to the mouse body by the hinge, and the extension part and the mouse body can rotate relatively to the hinge in order to convert the form of the foldable computer mouse;
   wherein when the extension part rotates to a predetermined location, the foldable computer mouse is in an extension form and the sensor is exposed, yet when the extension part is located inside the receiving space, the foldable computer mouse is in a compact form, and the sensor is also exposed.

8. The foldable computer mouse as claimed in claim 7, wherein the capacity of the receiving space is bigger than the volume of the extension part for embedding the extension part in the receiving space completely.

9. The foldable computer mouse as claimed in claim 8, wherein the depth of the receiving space turns from deep to shallow, and the hinge is located at the deepest spot of the receiving space.

10. The foldable computer mouse as claimed in claim 7, the extension part further comprising a first side pivotally connected to the mouse body by the hinge and a second side opposite to the first side, wherein when the extension part rotates outwards to the predetermined location, the second side and the bottom of the mouse body are at the same level.

11. The foldable computer mouse as claimed in claim 7, wherein the extension part is an ergonomic plate, and the ergonomic plate is curved.

12. The foldable computer mouse as claimed in claim 11, wherein the configuration of the receiving space matches the shape of the ergonomic plate substantially.

13. A computer mouse comprising:
   a mouse body having an upper surface and a bottom, the bottom having a receiving space and a contact surface;
   a sensor disposed on the contact surface, the sensor detecting the motion of the mouse body relatively to a plane when the mouse body is placed on the plane; and
   an extension part pivotally connected to the mouse body, when the extension part rotating out from the receiving space, the extension part extending the upper surface and when the extension part rotating inwards into the receiving space, the sensor is kept exposed out from the bottom of the mouse body to detect the relative motion on the plane.

14. The mouse as claimed in claim 13, wherein when the extension part rotates outwards to the receiving space, an upper edge of the extension part connects to the top of the side wall close to the user of mouse body, and a lower edge of the extension part is in touch with the plane.

15. The mouse as claimed in claim 13, wherein the bottom of the receiving space is a slope extended from the top of the side wall close to the user to the sensor.

16. The mouse as claimed in claim 13, the bottom of the mouse body further comprising a finger insertion space which allows user's finger insertion to lift the extension part, wherein the finger insertion space and the receiving space are communicated.

17. The mouse as claimed in claim 13, wherein the lower edge of the extension part is a pre-designed curve, and the receiving space substantially comprises the same pre-designed curve.

18. The mouse as claimed in claim 13, wherein the mouse further comprises an elastic element disposed between the upper edge of the extension part and the mouse body for providing elasticity to rotate the extension part towards the receiving space.

* * * * *